(12) United States Patent
Nien et al.

(10) Patent No.: US 10,685,263 B2
(45) Date of Patent: Jun. 16, 2020

(54) SYSTEM AND METHOD FOR OBJECT LABELING

(71) Applicant: INDUSTRIAL TECHNOLOGY RESEARCH INSTITUTE, Hsinchu (TW)

(72) Inventors: Wei-Po Nien, Taichung (TW); Chung-Hsien Yang, Taipei (TW); Chun-Fu Chuang, Kaohsiung (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 106 days.

(21) Appl. No.: 15/987,452

(22) Filed: May 23, 2018

(65) Prior Publication Data
US 2019/0266439 A1 Aug. 29, 2019

(30) Foreign Application Priority Data

Feb. 26, 2018 (TW) .............................. 107106279 A

(51) Int. Cl.
*G06K 9/62* (2006.01)
*G06T 7/73* (2017.01)
(Continued)

(52) U.S. Cl.
CPC .............. *G06K 9/627* (2013.01); *G06K 9/66* (2013.01); *G06N 20/00* (2019.01); *G06T 7/74* (2017.01);
(Continued)

(58) Field of Classification Search
CPC .................................. G06K 9/627; G06K 9/66
See application file for complete search history.

(56) References Cited

U.S. PATENT DOCUMENTS

| 9,476,730 B2 | 10/2016 | Samarasekera |
| 9,488,492 B2 | 11/2016 | Samarasekera |

(Continued)

FOREIGN PATENT DOCUMENTS

| CN | 105631479 A | 6/2016 |
| CN | 103559237 B | 2/2017 |

(Continued)

OTHER PUBLICATIONS

Lin_ et al, "Multi-source image auto-annotation," *2013 IEEE International Conference on Image Processing*, Melbourne, VIC, 2013, pp. 2567-2571.

(Continued)

*Primary Examiner* — Tuan H Nguyen
(74) *Attorney, Agent, or Firm* — Muncy, Geissler, Olds & Lowe, P.C.

(57) ABSTRACT

An object labeling system includes a first object labeling module, a second object label model, a label integrating module and an inter-frame tracking module. The first object label module is configured to generate a first object labeling result according to a first 2D image, wherein the first 2D image is one of the frames of a 2D video. The second object labeling module is configured to generate a second 2D image according to a 3D information, and to generate a second object labeling result according to the 3D information and the second 2D image. The label integrating is configured to generate a third object labeling result according to the first object labeling result and the second object labeling result. The inter-frame tracking module is configured to perform an inter-frame object labeling process according to the third object labeling result to generate a fourth object labeling result.

14 Claims, 6 Drawing Sheets

(51) Int. Cl.
  *G06K 9/66* (2006.01)
  *G06N 20/00* (2019.01)
(52) U.S. Cl.
  CPC ............ *G06T 2200/04* (2013.01); *G06T 2207/10016* (2013.01); *G06T 2207/20132* (2013.01)

(56) References Cited

U.S. PATENT DOCUMENTS

| | | |
|---|---|---|
| 2006/0074634 A1 | 4/2006 | Gao |
| 2008/0221874 A1 | 9/2008 | Cao |
| 2012/0300089 A1 | 11/2012 | Sbaiz |
| 2015/0049091 A1 | 2/2015 | Nachman |
| 2015/0248586 A1 | 9/2015 | Gaidon et al. |
| 2017/0220887 A1* | 8/2017 | Fathi ............... G06K 9/00201 |
| 2018/0068452 A1* | 3/2018 | Ito ............... G06T 7/187 |
| 2018/0114142 A1* | 4/2018 | Mueller ............... G06F 17/16 |

FOREIGN PATENT DOCUMENTS

| | | |
|---|---|---|
| CN | 104317912 B | 7/2017 |
| JP | 2002232839 A | 8/2002 |
| JP | 2015142181 A | 8/2015 |
| JP | 2017146957 A | 8/2017 |
| TW | I302879 B | 11/2008 |
| TW | 201525879 A | 7/2015 |
| TW | I497449 B | 8/2015 |
| TW | 201601072 A | 1/2016 |
| TW | 201604821 A | 2/2016 |
| WO | WO2016031523 A1 | 3/2016 |

OTHER PUBLICATIONS

Jhuo_et al., "Image auto-annotation by exploiting web information," *2014 IEEE International Conference on Image Processing (ICIP)*, Paris, 2014, pp. 3052-3056.

Bakalem_et al., "A comparative image auto-annotation," *IEEE International Symposium on Signal Processing and Information Technology*, Athens, 2013, pp. 000086-000091.

Chen_et al., "Image Auto-Annotation and Retrieval Using Saliency Region Detecting and Segmentation Algorithm," *2012 Fourth International Conference on Digital Home*, Guangzhou, 2012, pp. 215-219.

Guo_et al., "Image Auto-annotation with Graph Learning," *2010 International Conference on Artificial Intelligence and Computational Intelligence*, Sanya, 2010, pp. 235-239.

Bakalem_et al., "Latent semantic analysis-based image auto annotation," *2010 International Conference on Machine and Web Intelligence*, Algiers, 2010, pp. 460-463.

* cited by examiner

SYSTEM AND METHOD FOR OBJECT LABELING

This application claims the benefit of Taiwan application Serial No. 107106279, filed Feb. 26, 2018, the subject matter of which is incorporated herein by reference.

BACKGROUND OF THE INVENTION

Field of the Invention

The disclosure relates to a system and method for object labeling.

Description of the Related Art

The technology of object detection is widely applied in many fields such as self-driving, satellite image analysis, vehicle real-time monitoring, and the like. In the process of establishing an automatic object detection system, a great amount of training data should be provided for object labeling model for self-learning in order to improve the accuracy of the labeling. However, in the prior art, most of training data rely on manual labeling, or semi-manual labeling (that is, labeled by low-level artificial intelligence and then manually labeled or adjusted). Therefore, in order to provide a great amount of training data, it is necessary to consume a large amount of human resources.

On the other hand, if it is determined that not to spend too much human resources on providing training data, and only low-level artificial intelligence is used for object labeling, the requirement of accuracy of the labeling results may be difficult to be met.

SUMMARY OF THE INVENTION

The present disclosure is in a purpose of providing system and method for labeling object.

An embodiment of the present disclosure discloses an object labeling system including a first object labeling module, a second object label model, a label integrating module and an inter-frame tracking module. The first object label module is configured to generate a first object labeling result according to a first 2D image, wherein the first 2D image is one of the frames of a 2D video. The second object labeling module is configured to generate a second 2D image according to a 3D information, and to generate a second object labeling result according to the 3D information and the second 2D image. The label integrating is configured to generate a third object labeling result according to the first object labeling result and the second object labeling result. The inter-frame tracking module is configured to perform an inter-frame object labeling process according to the third object labeling result to generate a fourth object labeling result.

An embodiment of the present disclosure discloses an object labeling method, comprising: generating, by a first object labeling module, a first object labeling result according to a first 2D image, wherein the first 2D image is one of image frames of a 2D video; generating, by a second object labeling module, a second 2D image according to a 3D information, and a second object labeling result according to the 3D information and the second 2D image; generating, by a label integrating module, a third object labeling result according to the first object labeling result and the second object labeling result; and performing, by an inter-frame tracking module, an inter-frame object labeling process according to the third object labeling result to obtain a fourth object labeling result.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
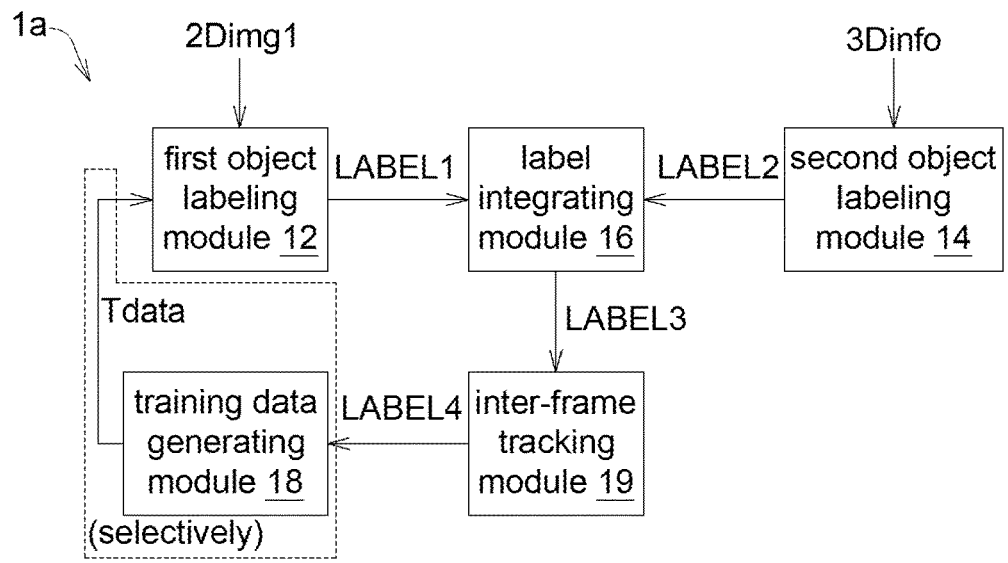
FIG. 1A shows a block diagram of system for object labeling according to an embodiment of the present disclosure.
Figure 2A:
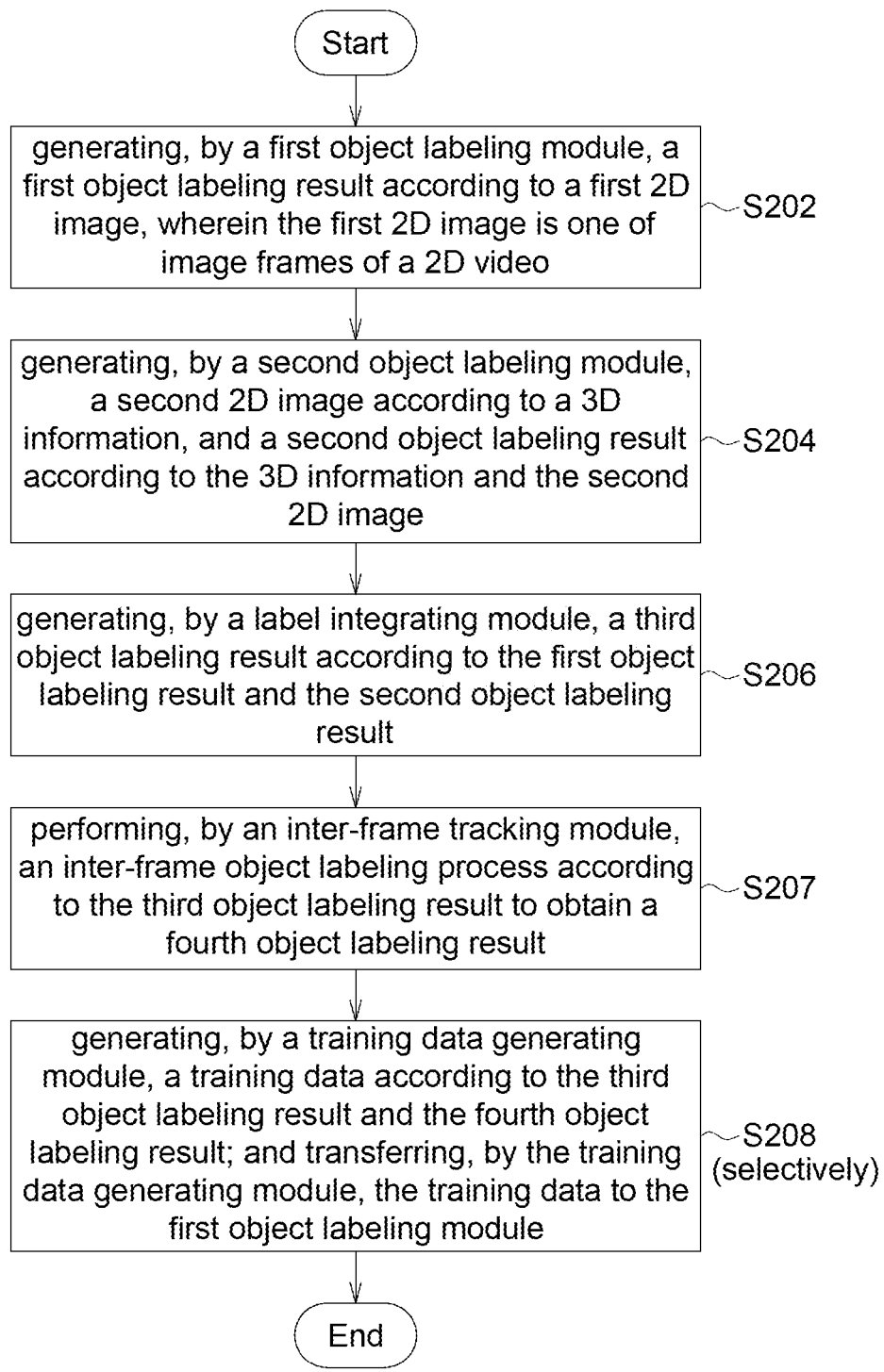
FIG. 2A shows a flow chart of method for object labeling according to an embodiment of the present disclosure.

Referring to FIG. 1A, FIG. 1A shows a block diagram of system for object labeling according to an embodiment of the present disclosure. Also, refers to method for object labeling shown in FIG. 2A, and schematic diagrams shown in FIG. 3A~3C, for understanding. The object labeling system 1a may be configured to detect, recognize and label objects in images or videos. The objects may include pedestrian, motorcycle, car or a combination thereof in the images or in the videos. The object labeling system 1a includes a first object labeling module 12, a second object labeling module 14, a label integrating module 16 and an inter-frame tracking module 19. In an embodiment, the object labeling system 1a may further include a training data generating module 18. In another embodiment, the training data generating module 18 is configured in an external device (not shown) that is coupled to the object labeling system 1a. In other words, the training data generating module 18 is selectively included in the object labeling system 1a.

The first object labeling module 12 is configured to receive a first two-dimensional (2D) image 2Dimg1. In an embodiment, the first 2D image 2Dimg1 is a real-time image obtained by a 2D camera. In another embodiment, the first 2D image 2Dimg1 is a 2D image stored in a computer readable storage device. The first 2D image 2Dimg1 may be an individual 2D image, picture or one of image frames of a 2D video. The "image frame" described herein refers to a frame of a video. For example, a video with frame rate of 25 fps has 25 image frames per second.

The first object labeling module 12 may generate a first object labeling result LABEL1 according to the first 2D image 2Dimg1 (step S202). In an embodiment, the first object labeling module 12 is an application, computer readable instructions, program or process stored in one or more computer readable media, having function of self-learning (e.g., deep learning). When the first object labeling module 12 is performed by one or more processors, recognizing and labeling object(s) in the first 2D image 2Dimg1 may be implemented (for example, one or more objects may be framed and labeled with an object type such as pedestrian, motorcycle, and car) to generate the first object labeling result LABEL1. For instance, when labeling object(s), the first object labeling module 12 may firstly filter noise or other information which may affect object recognizing by using one or more filters. Then, the first object labeling module 12 finds out contour(s) that might be object(s), and determines the contour(s) is/are object(s) according to the contour(s). If a contour is determined as an object, the first object labeling module 12 further determines an object type for the object. The first object labeling module 12 frames all the recognized objects by object frames and labels the object type respectively to generate the first object labeling module LABEL1. In another embodiment, the first object labeling module 12 may employ existing object labeling module such as Faster R-CNN, SSD and YOLOv2.

Figure 3A:
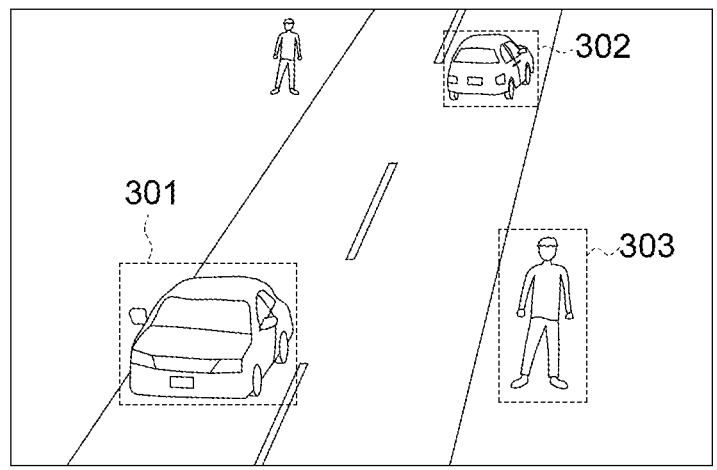
FIGS. 3A~3D show schematic diagrams of performing method for object labeling.

For example, as shown in FIG. 3A, the first object labeling result LABEL1 generated by the first object labeling module 12 includes objects framed by object frames 301, 302 and 303 with object types of car, car and pedestrian respectively.

The second object labeling module 14 is coupled to the first object labeling module 12, and is configured to receive a three-dimensional (3D) information 3Dinfo. In an embodiment, the 3D information 3Dinfo is a real-time 3D image or real-time information obtained or sensed by a 3D camera or a space sensor (e.g., a Lidar). In another embodiment, the 3D information is an image or data stored in a computer readable storage device. In still another embodiment, the 3D information 3Dinfo and the first 2D image 2Dimg1 are obtained, by one or more devices that including a number of heterogeneous sensors, by photographing or sensing the same region at substantially the same angle and at the same time. The heterogeneous refers to, for example, a 2D sensor and a 3D sensor, that two sensors are different in the dimensions that can be sensed by the two sensors and are different basically. The 3D information 3Dinfo may include point cloud which represents position (e.g., 3D coordinates), color information (e.g., RGB values), the depth of object(s), the intensity of the reflected light produced by the light is irradiated on object(s) or a combination thereof of each point in the photographing or sensing area.

The second object labeling module 14 may generate a second 2D image according to the 3D information 3Dinfo, and may generate a second object labeling result LABEL2 according to the 3D information 3Dinfo and the second 2D image (step S204). In an embodiment, the second object labeling module 14 is an application, computer readable instructions, program or process stored in one or more computer readable media. When the second object labeling module 14 is performed by one or more processors, the following may be implemented: converting the 3D information to the second 2D image by using conversion logic or conversion algorithm well known by the skilled person in the art; deriving position, size, contour and the like of one or more objects based on the 3D information 3Dinfo, and framing the derived object(s) in the second 2D image by using object frame(s) to generate the second object labeling result LABEL2.

Figure 3B:
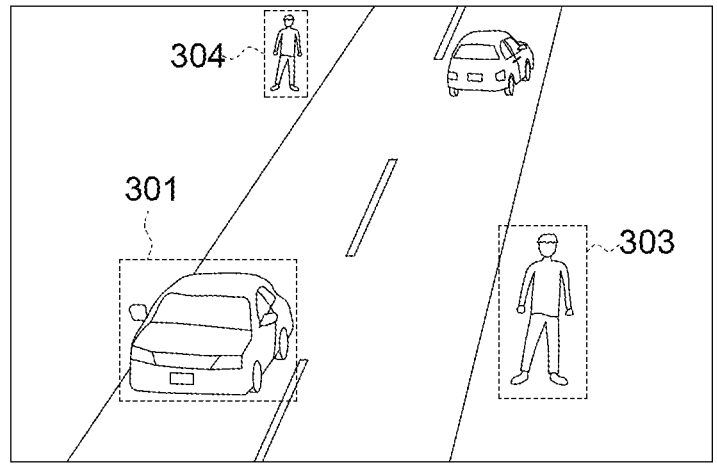
Figure 3C:
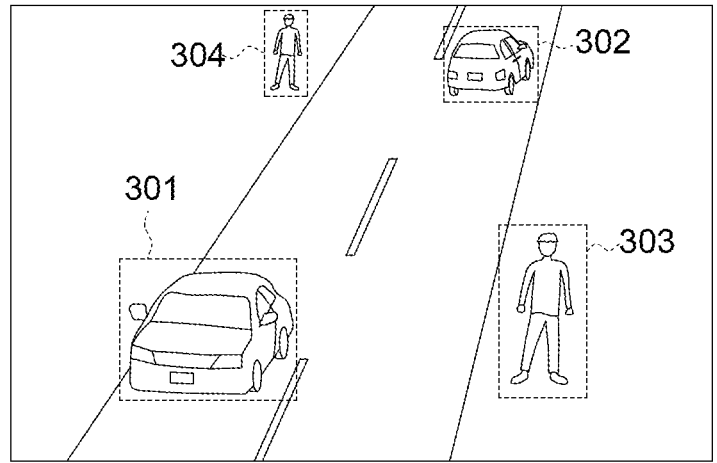

For example, as shown in FIG. 3B, the second object labeling result LABEL2 generated by the second object labeling module 14 includes objects framed by object frames 301, 303 and 304 with object types of car, pedestrian and pedestrian respectively. It should be noted that, since the second 2D image is generated based on the 3D information 3Dinfo, the second 2D image may be different from the first 2D image 2Dimg1. FIGS. 3A~3C are for illustration purposes only and are not intended to limit the present disclosure.

The label integrating module 16 is coupled to the first object labeling module 12 and the second object labeling module 1. The label integrating module 16 may generate a third object labeling result LABEL3 according to the first object labeling result LABEL1 and the second object labeling result LABEL2 (step S206). In an embodiment, the label integrating module 16 is an application, computer readable instructions, program or process stored in one or more computer readable media. When the label integrating module 16 is perform by one or more processors, the following may be implemented: generating the third object labeling result LABEL3 according to the first object labeling result LABEL1 and the second object labeling result LABEL2. In an embodiment, the label integrating module 16 derives the union of the first object labeling result LABEL1 and the second object labeling result LABEL2 as the third object labeling result LABEL3. That is, the object(s) labeled in the third object labeling result LABEL3 may include the object(s) labeled in the first object labeling result LABEL1 and the object(s) labeled in the second object labeling result LABEL2. For example, as shown in FIG. 3C, the third object labeling result LABEL3 includes objects framed by object frames 301, 302, 303 and 304 with object types of car, car, pedestrian and pedestrian respectively.

The inter-frame tracking module 19 is coupled to the label integrating module 16. In an embodiment, the inter-frame tracking module 19 is an application, computer readable instructions, program or process stored in one or more computer readable media. When the inter-frame tracking module 19 is performed by one or more processors, the following may by implemented: performing an inter-frame object labeling process according to the third object labeling result LABEL3 to generate a fourth object labeling result LABEL4 (step S207).

Figure 2B:
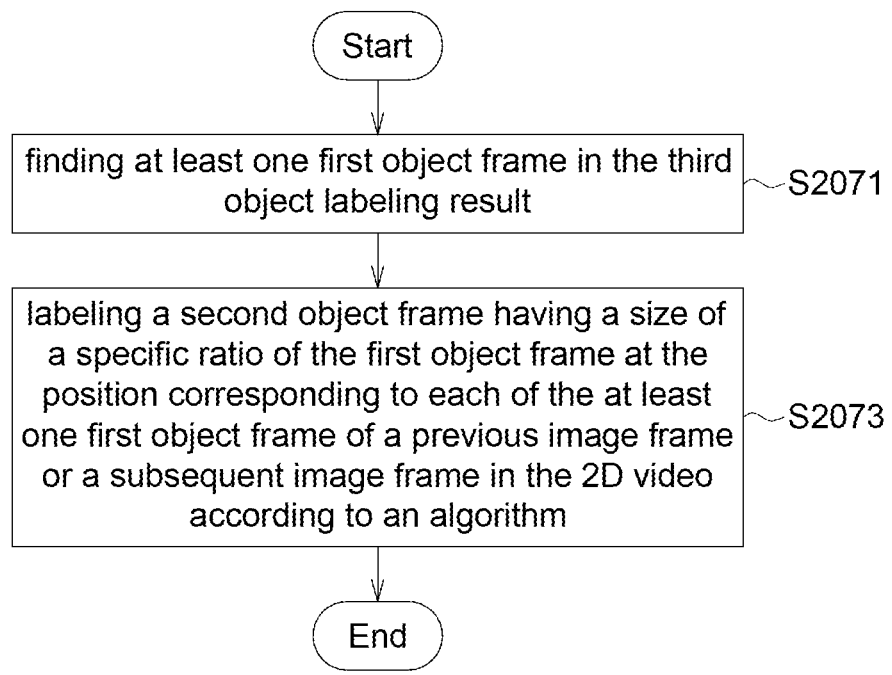
FIG. 2B shows a flow chart of method for object labeling according to another embodiment of the present disclosure.

To clearly illustrate the inter-frame object labeling process, please refers to a flow chart of the inter-frame object labeling process shown in FIG. 2B and schematic diagrams of performing the inter-frame object labeling process shown in FIGS. 4A~4D.

The inter-frame object labeling process includes steps S2071 and S2073. In step S2071, the inter-frame tracking module 19 finds at least one first object frame (e.g., 601, 605 in FIG. 4A) in the third object labeling result LABEL3. In step S2073, the inter-frame tracking module 19 labels a second object frame with a specific size of the first object frame at the position corresponding to each of the at least one first object frame in a previous image frame or a subsequent image frame (or the third object labeling result which is generated according to the previous image frame or the subsequent frame of the first 2D image 2Dimg1) according to an algorithm to generate the fourth object labeling result LABEL4 (e.g., 602, 603, 604 in FIG. 4B).

Figure 4A:
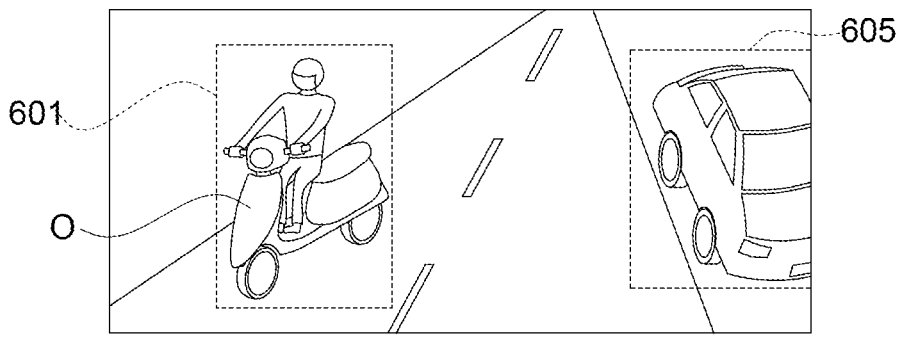
FIGS. 4A~4D show schematic diagrams of performing inter-frame object labeling process.
Figure 4B:
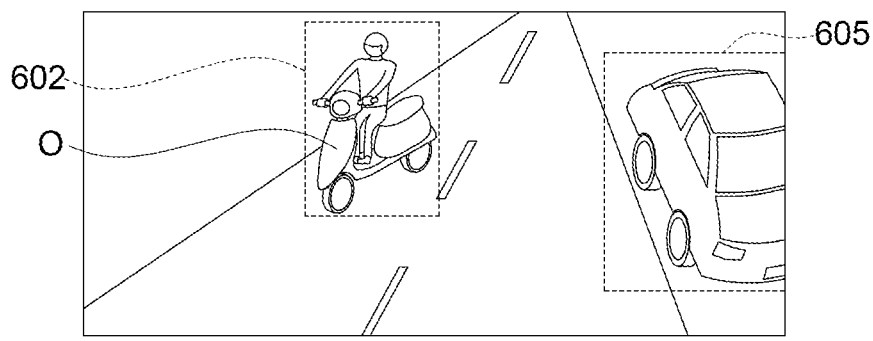
Figure 4C:
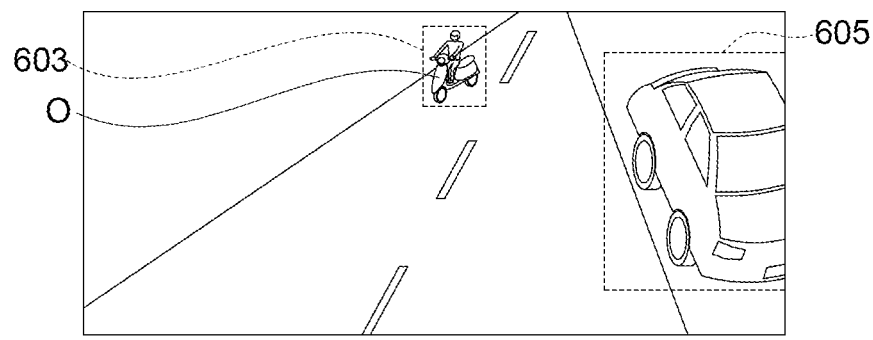
Figure 4D:
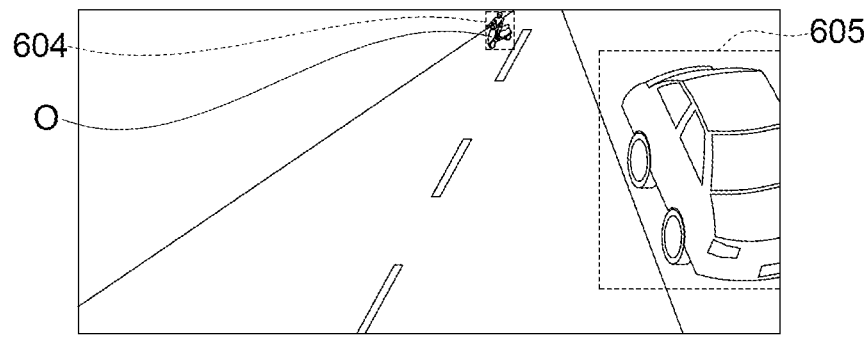

In an embodiment, FIGS. 4A~4D may be four image frames of a 2D video, where FIG. 4D firstly appear on the timeline, followed by FIG. 4C, FIG. 4B and FIG. 4A. in some cases, since an object of motorcycle O in FIG. 4D may not be large enough to be recognized and labeled by the first object labeling module 12 and the second object labeling module 14, as well as those in the image frames of FIG. 4C and FIG. 4B. Until the image frame of FIG. 4A, the object of motorcycle O is successfully labeled. In other words, before performing the inter-frame object labeling process, the object frames 602, 603, 604 does not exist, but object frame 601. When performing the inter-frame object labeling process, the inter-frame tracking module 19 may derive the speed and the moving direction of the object of motorcycle O according to, for example, optical flow algorithm, and a result that the object of motorcycle O is oncoming may be obtained. Then, the inter-frame tracking module 19 finds the position corresponding to the object frame 601 in the previous image frame in the video (i.e., FIG. 4B), derives the size of the object frame 602 according to the derived speed of the object of motorcycle O and marks the object frame 602 on the previous image frame to label the object of motorcycle O. The inter-frame tracking module 19 repeats the actions described above to label the object frame 603, 604 as the fourth object labeling result LABEL4. In an embodiment, the fourth object labeling result LABEL4 may be input into the training data generating module 18.

In another embodiment, FIGS. 4A~4D may be four image frames of a 2D video, where FIG. 4A firstly appear on the timeline, followed by FIG. 4B, FIG. 4C and FIG. 4D. The difference between this embodiment and the previous one is that the inter-frame tracking module 19 may find the position corresponding to the object frame 601 in the subsequent image frame in the video to label the object of motorcycle O.

In an embodiment, the object labeling system 1a may further include a register (not shown), configured to store the third object labeling result LABEL3, the fourth object labeling result LABEL4 or a combination thereof. When the inter-frame object labeling process is performed by the inter-frame tracking module 19, the third object labeling result(s) LABEL3 generated according to the previous one (or more) image frame may be extracted from the register.

In an embodiment, the inter-frame tracking module 19 may label the object frame 602 by the size of the specific ratio, e.g., 0.5, of the object frame 601, but the present disclosure is not limited by.

In addition, as shown in FIGS. 4A~4D, since the object labeled by the object frame 605 is a static object, the object frame 605 always exists in FIG. 4A~4D, and the size is unchanged.

The training data generating module 18 is coupled to the inter-frame tracking module 19. The training data generating module 18 may generate a training data Tdata according to the fourth object labeling result LABEL4 (or according to the third object labeling result LABEL3 and the fourth object labeling result LABEL4), and may provide the training data Tdata to the first object labeling module 12 (step S208). Noted that, step S208 may be performed selectively. For example, when the training data generating module 18 is included in the object labeling system 1a, step S208 may be performed; when the training data generating module 18 is disposed outside the object labeling system 1a (i.e., the training data generating module 18 is not included in the object labeling system 1a), step S208 may not be included in this process, but may be performed in other process. In an embodiment, the training data generating module 18 is an application, computer readable instructions, program or process stored in one or more computer readable media. When the training data generating module 18 is performed by one or more processors, may generate the training data Tdata based on the fourth object labeling result LABEL4, and may provide the training data Tdata to the first object labeling module 12.

In an embodiment, the training data generating module 18 may generate a text file (e.g., .txt file) according to the fourth object labeling result LABEL4 (or according to the third object labeling result LABEL3 and also the fourth object labeling result LABEL4). The content of the text file records the object type, position and size of the object(s) labeled in the fourth object labeling result LABEL4. That is, the text file is a description of the object(s) labeled in the fourth object labeling result LABEL4, or the text file is used for describing the object(s) labeled in the fourth object labeling result LABEL4. The training data generating module 18 may associate the fourth object labeling result LABEL4 with the text file as the training data Tdata and provide the training data Tdata to the first object labeling module 12. In an embodiment, after the training data Tdata generated by the training data generating module 18, the training data generating module 18 may store the training data Tdata into a database. The first object labeling module 12 may perform self-learning by reading data stored in the database, to improve accuracy of labeling.

In an embodiment, the training data Tdata is used by the first object labeling module 12 as a first ground truth. The first object labeling module 12 may compare the first object labeling result LABEL1 to the training data Tdata (i.e., the first ground truth), and calculate the difference or similarity between the two. For example, the first object labeling module 12 calculates an intersection over union (IOU) between the first object labeling result LABEL1 and the training data Tdata to obtain a first confidence, where the IOU may be calculated, for example, by dividing the number of intersections of the objects labeled in the two by the number of unions of the objects labeled in the two. For example, referring to FIG. 3A and 3C, assuming that the fourth object labeling result LABEL4 is identical to the third object labeling result LABEL3 and the corresponding text file is used as the training data, the IOU between the first object labeling result LABEL1 and the fourth object labeling result LABEL4 is 75%. The smaller the difference between the first object labeling result LABEL1 and the training data Tdata is (or the larger the IOU is), the higher the first confidence. That is, the closer the first object labeling module 12 is to the first ground truth. The higher the accuracy of the first object labeling module 12 is considered. On the contrary, the larger the difference between the first object labeling result LABEL1 and the training data Tdata is (or the smaller the IOU is), the lower the first confidence. In addition, the first object labeling module 12 may adjust one or more parameters of the first object labeling module 12 according to the training data Tdata. After multiple adjustments and corrections, the first object labeling result LABEL1 generated by the first object labeling module 12 may be more and more similar to the training data Tdata, i.e., the accuracy may become higher and higher.

In an embodiment, the second object labeling module 14 may calculate a second confidence according to a second ground truth and the second object labeling result LABEL2. The second ground truth may be generated by receiving user's input for labeling objects in the second 2D image, or generated by calculating by a neural network (according to the previous fourth object labeling result LABEL4 or the previous training data Tdata). The second object labeling module 12 calculates difference or similarity (e.g., IOU) between the second object labeling result LABEL2 and the second ground to obtain the first confidence. The higher the second confidence is, the closer the second object labeling result LABEL2 to the second ground truth, and the higher the accuracy.

In an embodiment, the label integrating module 16 may determine a weight ratio according to the first confidence and the second confidence. The label integrating module 16 may determine a ratio between the first object labeling result LABEL1 and the second object labeling result LABEL2 to be used according to the weight ratio. For example, in a lower brightness environment, the first object labeling module 12 may have a lower first confidence, and the second object labeling module 14 may have a higher second confidence. In this case, the label integrating module 16 may determine that the weight ratio is biased toward the second object labeling module 14. That is, integrating the first object labeling result LABEL1 and the second object labeling result LABEL2, the label integrating module 16 employs more objects labeled in the second object labeling result LABEL2, and fewer objects labeled in the first object labeling result LABEL1.

In an embodiment, the training data generating module 18 may calculate a third confidence according to the fourth object labeling result LABEL4 and a third ground truth, where the third ground truth may be calculate by a neural network, for example, according to the previous labeling result or the previous training data. The training data generating module 18 may determine whether to enable a manual assisted labeling process according to the third confidence. For example, when the third confidence is lower than a threshold, the training data generating module 18 may determine to enable the manual assisted labeling process. When the manual assisted labeling process is enabled, the training data generating module 18 may be able to receive input(s) from a user, for example, through a user interface, to adjust or correct the third object labeling result LABEL3, training data Tdata or a combination thereof, for example, to remove the wrongly labeled object(s), modify the object type of the labeled object, label the unlabeled object, or a combination thereof. In an embodiment, when the first object labeling module 12 and the second object labeling module 14 have differences in determining whether one or more objects is an object, the training data generating module 18 may enable the manual assisted labeling process. For example, in FIG. 3A, the first object labeling module 12 determines that the object frame 302 labels an object with an object type of car. In FIG. 3B, the second object labeling module 14 determines that the position corresponding to the object frame 302 is not an object. In this case, the training data generating module 18 may enable the manual assisted labeling process. For example, a window displaying the object and the object label 302 labeled the first object labeling module 12 is pop out on the user interface for the user to select whether the object frame 302 actually labels an object.

In an embodiment, when the first confidence, the second confidence and the third confidence are too low (e.g., the first confidence, the second confidence and the third confidence are low than the threshold), the training data generating module 18 may enable the manual assisted labeling process. In the manual assisted labeling process, one or more object candidates may be displayed on the user interface for the user to select whether each of the object candidate(s) is actually an object. Then, the training data generating module 18 may generate the training data Tdata according to selection(s) of the user.

Figure 1B:
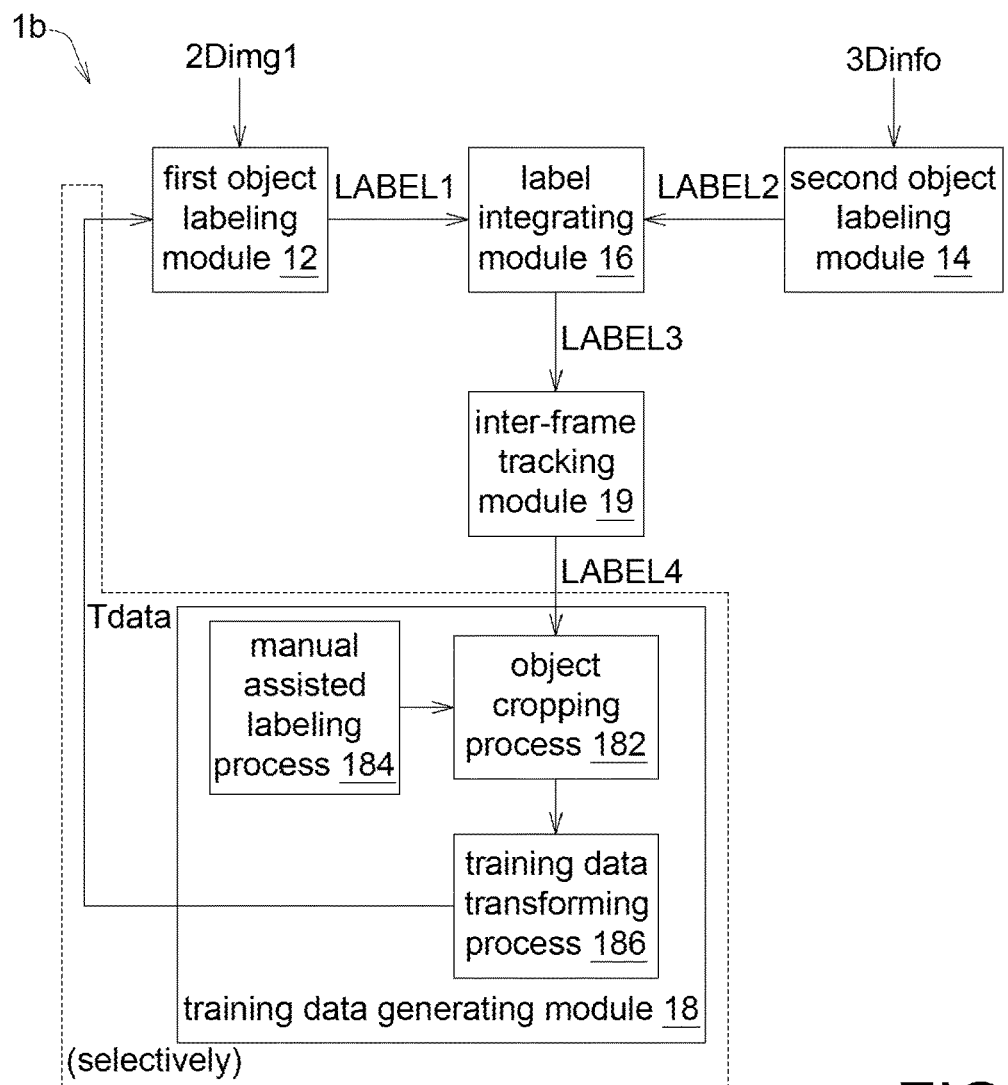
FIG. 1B shows a block diagram of system for object labeling according to another embodiment of the present disclosure.

Referring to FIG. 1B, FIG. 1B shows a block diagram of system for object labeling according to another embodiment of the present disclosure. For understanding, please also refers to FIG. 3D. The object labeling system 1b is similar to the object labeling system 1a. The difference between the object labeling system 1b is similar to the object labeling system 1a is the training data generating module 18.

In this embodiment, the training data generating module 18 includes an object cropping process 182, a manual assisted labeling process 184 and a training data transforming process 186, where the enabling and details of the manual assisted labeling process 184 is similar to above description.

Figure 3D:
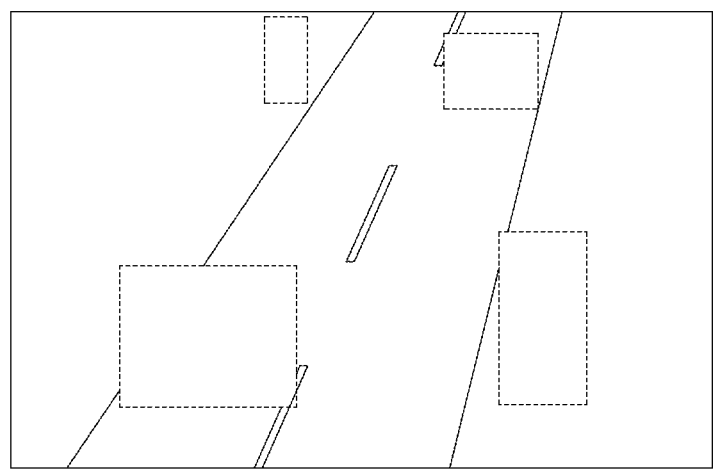
Figure 3D:
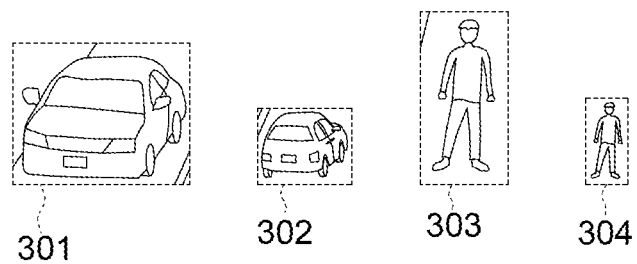

When the object cropping process 182 is performed, the training data generating module 18 may crop the object(s) labeled in the fourth object labeling result LABEL4 (as shown in FIG. 3D, assuming that the fourth object labeling result LABEL4 is identical to the third object labeling result LABEL3), and may then classify the cropped object(s) according to the object type(s). when the training data transforming process is performed, the training data generating module 18 may send the cropped objects labeled by the object frame 301~304 into a neural network for analysis to obtain the common characteristics, contours, parameters, or a combination thereof of the objects having the same object type, to generate training data Tdata, which is different from the object labeling system 1a. When calculating the first confidence, the first object labeling module 12 may calculate the difference between the characteristics, contours, parameters or a combination thereof of the objects of each object type in the training data Tdata and those used by the first object labeling module 12 for recognizing objects. When performing self-learning, the first object labeling module 12 may adjust or correct the characteristics, contours, parameters or a combination thereof used for recognizing objects of each object type according to the training data Tdata.

Noted that, in an embodiment, the first object labeling module 12, the second object labeling module 14, the label integrating module 16 and the inter-frame tracking module 19 (and also, selectively included, the training data generating module 18) may be integrated in one device (e.g., a main computer of a monitoring center or a mobile computer of a self-driving car), and perform the method by using the first 2D image 2Dimg1 and 3D information 3Dinfo provided by a 2D camera and a 3D camera connected externally. In another embodiment, the first object labeling module 12 may be integrated in a 2D camera; the second object labeling module 14 may be integrated in a 3D camera; the label integrating module 16 and the inter-frame tracking module 19 (and also, selectively included, the training data generating module 18) may be configured in a server. in this case, the first object labeling module 12 (i.e., the 2D camera) generates the first object labeling result LABEL1 according to the first 2D image 2Dimg obtained by itself, and transfers the first object labeling result LABEL1 to the server; and the second object labeling module 14 (i.e., the 3D camera) generates the second object labeling result LABEL2 according to the 3D information 3Dinfo obtained by itself, and transfers the second object labeling result LABEL2 to the server. In the in the server terminal, the label integrating module 16 integrates the first object labeling result LABEL1 and the second object labeling result LABEL2 to the third object labeling result LABEL3; the inter-frame tracking module 19 generates the fourth object labeling result LABEL4 according to the third object labeling result LABEL3; and the training data generating module 18 generates the training data Tdata according to the four object labeling result LABEL4 (or according to both the third object labeling result LABEL3 and the fourth object labeling result LABEL4). In other words, the module described above may not only be implemented by software, but also by hardware or firmware.

According to the above embodiments, the object labeling system and the object labeling method can employ the first 2D image 2Dimg1 and the 3D information 3Dinfo with different dimensions as the inputs of the first object labeling module 12 and the second object labeling 14 respectively to obtain the first object labeling result LABEL1 and the second object labeling result, and then the first object labeling result LABEL1 and the second object labeling result are integrated to obtain the third object labeling result LABEL3. The inter-frame tracking module 19 generates the fourth object labeling result LABEL4 according to the third object labeling result LABEL3, and then the training data generating module 18 generates the training data Tdata based on the fourth object labeling result LABEL4 to provide to the first object labeling module 12 for learning. Since the first 2D image 2Dimg2 and the 3D information 3Dinfo may provide different information, the first object label module 12 and the second object labeling module 14 respectively have environments or objects that are good at recognizing or not good at recognizing. By combining the object labeling results provided by the two, the effect of complementing each other can be achieved. Not only can increase the degree of automation of labeling, reduce the proportion of manual labeling, but also can increase the accuracy of object labeling. In addition, the dynamic objects in the video are tracked and labeled by the inter-frame tracking module 19 and the inter-frame object labeling process. By using the inter-frame tracking module 19 and the inter-frame object labeling process, the objects that are not labeled by the first object label module 12 and the second object labeling module 14 can be tracked and labeled, so that the accuracy of object labeling may be further improved and also the need for manual assisted labeling may be further reduced.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An object labeling system, comprising:
   a first object labeling module, configured to generate a first object labeling result according to a first 2D image, wherein the first 2D image is one of image frames of a 2D video;
   a second object labeling module, configured to generate a second 2D image according to a 3D information, and configured to generate a second object labeling result according to the 3D information and the second 2D image;
   a label integrating module, configured to generate a third object labeling result according to the first object labeling result and the second object labeling result; and
   an inter-frame tracking module, configured to perform an inter-frame object labeling process according to the third object labeling result, to obtain a fourth object labeling result.

2. The object labeling system according to claim 1, further comprising:
   a training data generating module, configured to generate a training data according to the third object labeling result and the fourth object labeling result, and configured to transfer the training data to the first object labeling module.

3. The object labeling system according to claim 2, wherein the training data generating module determines whether to enable a manual assisted labeling process according to the fourth object labeling result and a third confidence.

4. The object labeling system according to claim 2, wherein the training data generating module generates a text file for describing the fourth object labeling result, and connects the fourth object labeling result and the text file as the training data; or the training data generating module crops and classifies one or more objects labeled by one or more object frames as the training data.

5. The object labeling system according to claim 1, wherein the inter-frame object labeling process comprises:
   finding at least one first object frame in the third object labeling result; and
   labeling a second object frame having a size of a specific ratio of the first object frame at the position corresponding to each of the at least one first object frame of a previous image frame or a subsequent image frame in the 2D video according to an algorithm.

6. The object labeling system according to claim 1, wherein the first object labeling module further calculates a first confidence according to the first object labeling result and a first ground truth, the second object labeling module further calculates a second confidence according to the second object labeling result and a second ground truth, the label integrating module determines a weight ratio according to the first confidence and the second confidence, and generates the third object labeling module further according to the weight ratio.

7. The object labeling system according to claim 1, wherein the third object labeling result is an union of the first object labeling result and the second object labeling result.

8. An object labeling method, comprising:
   generating, by a first object labeling module, a first object labeling result according to a first 2D image, wherein the first 2D image is one of image frames of a 2D video;
   generating, by a second object labeling module, a second 2D image according to a 3D information, and a second object labeling result according to the 3D information and the second 2D image;
   generating, by a label integrating module, a third object labeling result according to the first object labeling result and the second object labeling result; and
   performing, by an inter-frame tracking module, an inter-frame object labeling process according to the third object labeling result to obtain a fourth object labeling result.

9. The object labeling method according to claim 8, further comprising:
   generating, by a training data generating module, a training data according to the third object labeling result and the fourth object labeling result; and
   transferring, by the training data generating module, the training data to the first object labeling module.

10. The object labeling method according to claim 9, wherein the training data generating module determines whether to enable a manual assisted labeling process according to the fourth object labeling result and a third confidence.

11. The object labeling method according to claim 9, wherein the training data generating module generates a text file for describing the fourth object labeling result, and connects the fourth object labeling result and the text file as the training data; or the training data generating module crops and classifies one or more objects labeled by one or more object frames as the training data.

12. The object labeling method according to claim 8, wherein the inter-frame object labeling process comprises:
   finding at least one first object frame in the third object labeling result; and labeling a second object frame having a size of a specific ratio of the first object frame at the position corresponding to each of the at least one first object frame of a previous image frame or a subsequent image frame in the 2D video according to an algorithm.

13. The object labeling method according to claim 8, wherein the first object labeling module further calculates a first confidence according to the first object labeling result and a first ground truth, the second object labeling module further calculates a second confidence according to the second object labeling result and a second ground truth, the label integrating module determines a weight ratio according to the first confidence and the second confidence, and generates the third object labeling module further according to the weight ratio.

14. The object labeling method according to claim 8, wherein the third object labeling result is an union of the first object labeling result and the second object labeling result.

* * * * *